(12) United States Patent
Fortescue et al.

(10) Patent No.: US 6,975,983 B1
(45) Date of Patent: Dec. 13, 2005

(54) NATURAL LANGUAGE INPUT METHOD AND APPARATUS

(75) Inventors: Nicholas David Fortescue, Guildford (GB); Robert Alexander Keiller, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 898 days.

(21) Appl. No.: 09/699,510

(22) Filed: Oct. 31, 2000

Related U.S. Application Data

(63) Continuation-in-part of application No. 10/042,716, filed on Oct. 26, 2000, now abandoned.

(30) Foreign Application Priority Data

Oct. 29, 1999 (GB) .................................. 9925627

(51) Int. Cl.[7] .............................................. G10L 15/00
(52) U.S. Cl. ........................................ 704/9; 704/257
(58) Field of Search .................................... 704/9, 257

(56) References Cited

U.S. PATENT DOCUMENTS

| | | | | |
|---|---|---|---|---|
| 4,882,757 | A | * 11/1989 | Fisher et al. | ................. 704/253 |
| 5,265,014 | A | 11/1993 | Haddock et al. | ........ 364/419.08 |
| 5,625,749 | A | 4/1997 | Goldenthal et al. | ......... 395/2.63 |
| 5,848,388 | A | * 12/1998 | Power et al. | ................. 704/239 |
| 5,960,395 | A | 9/1999 | Tzirkel-Hancock | ......... 704/241 |
| 6,067,514 | A | * 5/2000 | Chen | .......................... 704/235 |
| 6,535,849 | B1 | * 3/2003 | Pakhomov et al. | .......... 704/235 |

FOREIGN PATENT DOCUMENTS

| | | |
|---|---|---|
| GB | 2 346 999 | 8/2000 |
| JP | 07-104782 * 4/1995 | .............. G10L 3/00 |

OTHER PUBLICATIONS

Jean-Claude Martin, "Tycoon: Theoretical Framework and Software Tools for Multimodal Interfaces", Intelligence and Multimodality in Multimedia Interfaces, John Lee (Ed.) AAI Press, www.limsi.fr/indivde/martin/publications/download.

Laurence Nigay, et al., "A Generic Platform for Addressing the Multimodal Challenge", Laboratorie de Genie Information, 1995. www.acm.org/sigchi/chi95/proceedings.paper. lmn.bd.gy.ntm.

M. Johnston, et al. "Unification-based Multimodal Integration", Oregon Graduate Inst., pp. 281-288.

I. Bazzi, et al., "Modeling Out-of-Vocabulary Words for Robust Speech Recognition", Massachusetts Institute of Technology.

(Continued)

*Primary Examiner*—Daniel Abebe

(74) *Attorney, Agent, or Firm*—Fitzpatrick, Cella, Harper & Scinto

(57) ABSTRACT

A system is disclosed for generating a modified data structure defining modified grammar rules for the recognition of a natural language input with pauses in which grammar rules for recognition of a natural language are analysed to identify positions in the grammar rules at which pauses can occur in the natural language. A modified data structure is generated defining the modified grammar rules in dependence upon the analysis. The modified data structure is used to improve the accuracy of recognition of a natural language input with pauses. Where the natural language input is used in conjunction with a second modality input, the analysis is performed to identify the positions of pauses in dependence upon the second modality inputs.

35 Claims, 16 Drawing Sheets

OTHER PUBLICATIONS

S. Caraballo, et al., "New Figures of Merit for Best-First Probabilistic Chart Parsing", 1998 Association for Computational Linguistics, pp. 275-298, vol. 24, #2.

D. Magerman, et al., "Pearl: A Probabilistic Chart Parser", University of PA, Proceedings, 2nd International Workshop for Parsing Technologies, May 1994.

S. Bird, et al., "One-Level Phonology: Autosegmental Representations and Rules as Finite Automata", 1994 Association for Computational Linguistics, pp. 55-90, vol. 20, No. 1.

D. Magerman, et al., "Efficiency Robustness and Accuracy in Picky Chart Parsing", 30th Annual Meeting of the Assoc. for Computational Linguistics, Jun. 1992, Delaware, pp. 40-47.

Mark W. Salisbury, et al., "Talk and Draw: Bundling Speech and Graphics", IEEE, Aug. 1990, pp. 59-65.

* cited by examiner

FIG. 7b

<SR Sub-Rule 1> = <fax this to him>
<SR Sub-Rule 2> = <fax this to>
<SR Sub-Rule 3> = <him>
<SR Sub-Rule 4> = <fax this>
<SR Sub-Rule 5> = <to him>
<SR Sub-Rule 6> = <to>
<SR Sub-Rule 7> = <fax>
<SR Sub-Rule 8> = <this to him>
<SR Sub-Rule 9> = <this to>

\<Modified SR Fax Rule\>   =

\<SR sub-rule 1\>

| \<SR sub-rule 2\>  \<SR sub-rule 3\>

| \<SR sub-rule 4\>  \<SR sub-rule 5\>

| \<SR sub-rule 4\>  \<SR sub-rule 6\>  \<SR sub-rule 3\>

| \<SR sub-rule 7\>  \<SR sub-rule 8\>

| \<SR sub-rule 7\>  \<SR sub-rule 9\>  \<SR sub-rule 3\>

FIG. 8a

\<Modified SR Fax Rule\>   =

\<SR sub-rule 1\>

| \<SR sub-rule 2\>  \<SR sub-rule 3\>

| \<SR sub-rule 4\>  (\<SR sub-rule 5\>  |  (\<SR sub-rule 6\>  \<SR sub-rule 3\>))

| \<SR sub-rule 7\>  (\<SR sub-rule 8\>  |  (\<SR sub-rule 9\>  \<SR sub-rule 3\>))

FIG. 8b

191   <SR sub-rule 1> & (click click)
192   <SR sub-rule 2> & click
193   <SR sub-rule 3> & click
194   <SR sub-rule 4> & click
195   <SR sub-rule 5> & click
196   <SR sub-rule 6> -
197   <SR sub-rule 7> -
198   <SR sub-rule 8> & (click click)
199   <SR sub-rule 9> & click

FIG. 11

<Modified MM Grammar fax rule> =

<SR sub-rule 1> & (click click)

| (<SR sub-rule 2> & click)(<SR sub-rule 3> & click)

| (<SR sub-rule 4> & click) [(<SR sub-rule 5> & click) | (<SR sub-rule 6> (<SR sub-rule 3> & click))]

|<SR sub-rule 7> [(<SR sub-rule 8> & (click click) | (<SR sub-rule 9> & click) (<SR sub-rule 3> & click)]

FIG. 12

NATURAL LANGUAGE INPUT METHOD AND APPARATUS

This application is a Continuation-In-Part of U.S. patent application Ser. No. 10/042,716, filed Oct. 26, 2000, now abandoned.

BACKGROUND OF THE INVENTION

1. Field of the Invention

The present invention generally relates to a natural language input method and apparatus to allow for computer usable data to be input by recognising a natural language input which includes pauses.

2. Description of Related Art

When inputting data in a natural language, a user may pause in the natural language input which can adversely affect the recognition of the natural language input.

In particular, in speech recognition which use context free grammars if a user inserts pauses other than at the places expected by a speech recognition engine e.g. at the end of a sentence, the resultant speech recognition accuracy can be adversely affected.

There are many reasons why a speaker may insert pauses during speech input e.g. when emphasising words where the pauses are not properly interpreted by the speech recogniser. Pauses may also occur in the speech input where actions are involved. One particular area in which this occurs is in the field of multimodal data input.

In general pauses or breaks may occur deliberately or inadvertently.

In order to increase the richness with which a user can interact with a machine, it has become common for the user to be able to interact the machine using more than one type of input device, i.e. more than one modality. For example, it is common in speech recognition systems used on general purpose computers to allow a user to input data using a speech recognition engine, and to supplement the input of speech data with mouse data and keyboard data. Multimodal systems combine input modalities such as touch, pen, speech and gesture to allow more natural and powerful communication than any single modality would alone.

When one of the modalities comprises a channel by which natural language can be input, in view of the interaction by a user with more than one modality at the same time, the inputting of data using a second modality can affect the inputting of data using natural language i.e. when a user is inputting data in a second modality, this can cause a delay in the input of natural language. For example, when a user uses a multimodal system for inputting speech and mouse events, the user may pause during speech in order to properly locate the pointer controlled by the mouse in order to generate the mouse event. This pause in the natural language input can in some instances cause errors in the recognition of the natural language input. The reason for this is that some speech recognition systems use context free grammars for the recognition process. A context free grammar defines a whole utterance (i.e. a portion of speech between pauses). Thus a pause appearing in the middle of what the recognition engine expects to be an utterance causes the recognition engine to treat the input speech as two shorter utterances. The recognition engine will thus try to match the two utterances separately to the grammar rules. This causes misrecognition.

SUMMARY OF THE INVENTION

It is therefore an object of the present invention to overcome this limitation in the prior art.

In accordance with the first aspect of the present invention there is provided a data processing apparatus for generating a modified data structure which defines modified grammar rules for recognition of a natural language input with pauses. A data structure defining grammar rules for recognition of a natural language is received and analysed to identify positions in the grammar rules at which pauses can occur in the natural language input. This is then used to generate the modified data structure.

In accordance with the present invention, there are many different pause criteria which can be used for the identification of pauses in the natural language input. The criteria can take into account the behaviour of an individual user, or whether or not other inputs are used.

The modified data structure can be generated simply by adding a form of marker or tag to the data structure to identify positions in the grammar rules at which pauses can occur in the natural language input. Alternatively or in addition, the grammar rules can be fragmented in accordance with the identified positions to generate sub grammar rules. The sub grammar rules can be arranged hierarchically to form the modified data structure.

The modified data structure, because it contains information to allow for pauses, can then be used for the recognition of the natural language input which includes pauses to thereby provide for more accurate recognition.

In the present invention the natural language input can comprise any form of natural language for communicating between people. This not only includes the conventional natural languages e.g. English, French, German etc., but also includes other natural languages such as sign language for which recognition can depend upon the temporal relationships of natural language units e.g. words and grammar rules are applied for recognition.

The analysis performs a prediction to identify where pauses may be inserted in the natural language input. This enables the recognition of the natural language either with or without the pauses i.e. it allows a user to be relaxed about pausing during the input of natural language.

The present invention is particularly suited for use with speech recognition as the first modality input. Certain speech recognition processes use grammar rules e.g. context free grammar rules for the recognition process. Unexpected-pauses-within the input speech can cause a reduction of recognition accuracy and thus the present invention can be used for generating speech recognition modified grammars which take into account pauses within the speech.

A further aspect of the present invention is applicable to multimodal input systems in which the first modality is a natural language input and a second modality comprises associated events e.g. mouse clicks or gestures. In order to recognise such multimodal input, the multimodal grammar in an embodiment of the further aspect of the invention defines multimodal grammar rules by defining grammar rules for the recognition of a natural language in conjunction with associated events in one or more further modalities. In such a system, events in a further modality can affect the timing of the input natural language and thus an analysis to identify where pauses can occur in the natural language can be carried out based on events in further modalities.

In order to enable data to be input into a multimodal system a modified multimodal data structure defining modified multimodal grammar rules is preferably generated in addition to the modified data structure defining modified grammar. In the modified multimodal grammar rules the relationships between events in the or each further modality is defined in relation to the modified grammar rules.

The present invention also provides an apparatus and method for generating data in a computer usable form using the data structure. The modified data structure is used in conjunction with a natural language input for the recognition of the natural language input. An example of such a system is a speech recognition engine which utilises the modified grammar rules in order to perform a speech recognition process.

The present invention also provides an apparatus and method for generating data in a computer usable form from a multimodal input. Recognised natural language data is input together with events for one or more further modalities. Also the multimodal modified data structure is used which defines the relationship between the modified grammar rules and the events in the or each further modality. An analysis is carried out to determine if the first modality input data and the or each further modality input data match any modified grammar rule and comply with any related events in the or each further modality. If a match is found, computer usable data can be generated in dependence upon the match.

The present invention can be embodied as a specific hardware system, or as software implemented by a processing system. Thus the present invention can be embodied as processor implementable instructions for controlling a processor e.g. a computer program. Such instructions can be provided in physical form to a processing system on a carrier medium e.g. floppy disk, CDROM, magnetic tape, any other programmable medium, or any form of carrier signal such as a signal carried over a computer network such as the Internet.

BRIEF DESCRIPTION OF THE DRAWINGS

Embodiments of the present invention will now be described with reference to the accompanying drawings, in which:

FIGS. 7a and 7b is a diagram illustrating the generation of the sub grammar rules;

FIGS. 8a and 8b illustrate the generation of the modified data structure defining the modified grammar rules;

FIG. 11 is a diagram illustrating the relationship between the sub grammar rules and the second modality events;

FIG. 12 is a diagram illustrating the modified multimodal data structure defining the modified multimodal grammar rules;

DESCRIPTION OF THE PREFERRED EMBODIMENTS

Figure 1:
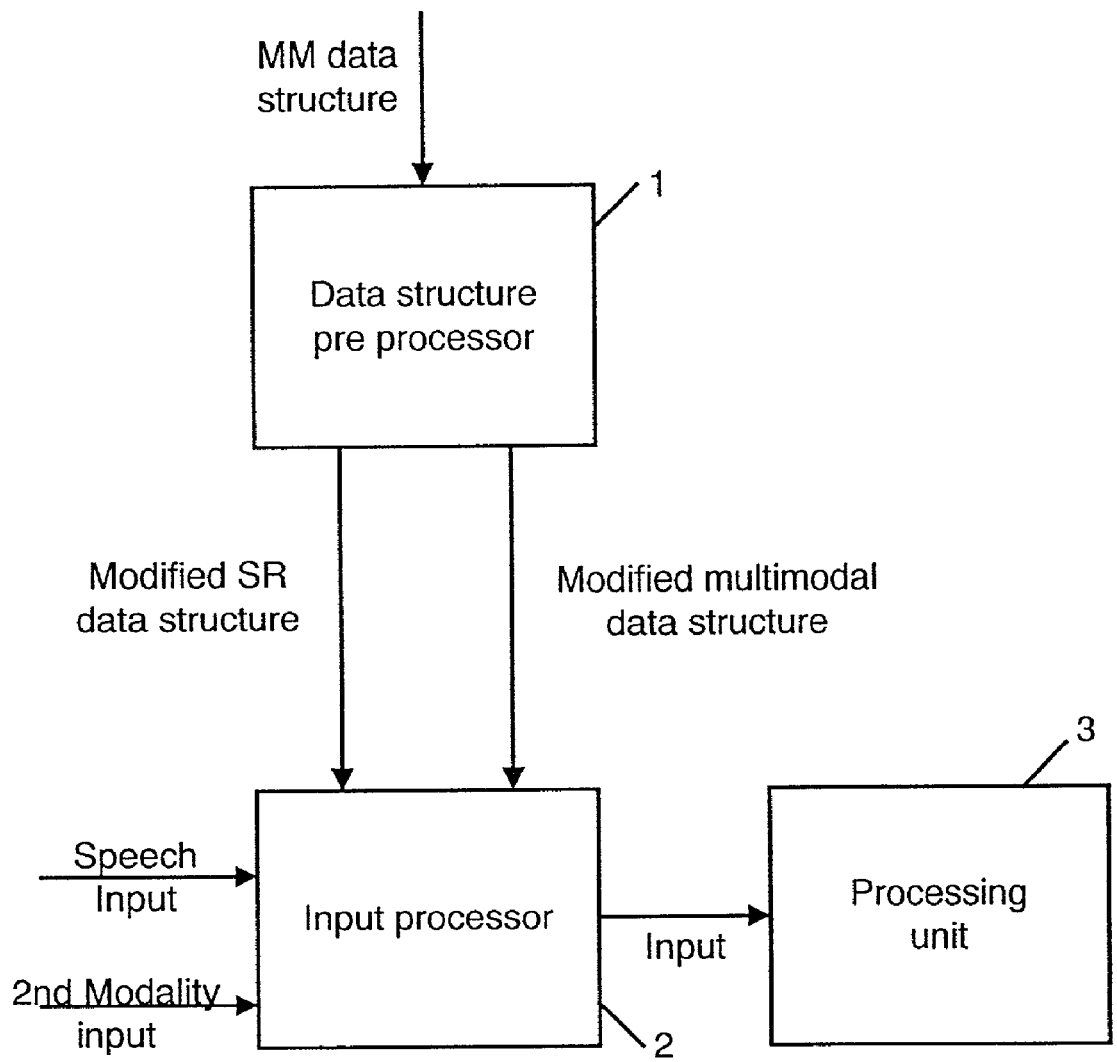
FIG. 1 is a schematic diagram of a generalised embodiment of the present invention.

The generalised embodiment of the present invention will now be described with reference to FIG. 1.

A processing unit 3 in a processing system is arranged to respond to a predetermined selection of multimodal inputs. The multimodal inputs are defined by rules forming a multimodal data structure. The rules employed for input to the processing unit are multimodal and are defined in terms of predetermined sequences of words in combination with associated second modality events.

An input processor 2 is provided to receive the multimodal inputs by the user. The input processor 2 attempts to match or fit the multimodal inputs to a rule to which the processing unit responds. If the multimodal input successfully matches a multimodal rule, the processing unit responds to the input in a manner dependent upon which rules it satisfies.

The multimodal input may comprise an instruction, a response to a prompt, a message, or a question. Thus the processing unit can respond to multimodal input which can comprise input data for processing by the processing unit and/or input instructions for causing the processing unit to perform a function.

In the illustrated embodiment, a user employs two separate modalities for input into the processing system, one of which is speech. The first and second modalities are interrelated such that events in the second modality depend upon events in the first modality.

Since one of the input modalities is speech, the input processor 2 makes use of a conventional, speech recognition (SR) engine which analyses the input speech signal to provide a result comprising the words it has recognised. In order to perform the speech recognition, the speech recognition engine utilises grammar rules in the form a data structure in order to perform the speech recognition process. The grammar rules define a grammar e.g. context free grammar of the natural language employed by a speaker providing the speech input which corresponds to the words within the multimodal rules employed for input to the processing unit.

Since, in this embodiment, the use of the second modality input causes the user to punctuate the speech input with pauses, the use of conventional grammar rules for the speech recognition engine can reduce the performance of the speech recognition engine. The use of the second modality input in conjunction with speech input can cause a user to vary his delivery of the words so that the users natural speech flow can be affected. Thus grammar rules extracted simply by extracting the words from within the multimodal rule employed for input to the processing unit will not take into account the effect of the second modality. Thus in the present embodiment the SR grammar rules to be used by the SR engine are obtained by a modification of the SR grammar rules within the multimodal data structure.

A data structure preprocessor 1 is provided to receive the multimodal data structure and generate a modified data structure defining modified grammar rules for the speech recognition engine and a modified multimodal data structure for use in the interpretation of the multimodal input.

In order to generate the modified data structure defining the modified grammar rules, the data structure preprocessor 1 analyses the multimodal rules defined by the multimodal data structure to determine the positions between spoken words where the speaker is expected to pause due to carrying out an action related to his need to input using the second modality. The data structure preprocessor 1 fragments each grammar rule in the multimodal rules on the basis of the pauses to form grammar sub rules. The content of the grammar sub rules plus their mutual relationships are used by the data structure preprocessor 1 to form the modified grammar rules defined by the modified data structure. In this way the modified grammar rules defined by the modified data structure accommodate the pauses influenced by the second modality input.

Thus the SR engine utilises the modified grammar rules provided by the modified data structure in order to generate a recognition result comprising a string of recognised words. The multimodal rules for input to the processing unit comprise a combination of such words and associated second modality events. The modified multimodal data structure is generated by the data structure preprocessor 1 in order to provide an improved way of identifying appropriate outputs from the SR engine in the light of the combination with recorded second modality events. Hence more accurate identification of a multimodal grammar rule can be achieved. Within the data structure preprocessor 1, the modified multimodal data structure is formed by integrating second modality events at the newly formed grammar sub rule level of the modified data structure. Thus the data structure preprocessor determines what multimodal events should be associated with each grammar sub rule within a modified grammar rule. The data structure preprocessor 1 forms the modified multimodal data structure from the determined associations.

The output of the speech recognition engine and the input second modality events are compared within the input processor 2 with the association specified in the modified multimodal data structure to determine which multimodal rule is matched by the multimodal input. If a multimodal rule is matched by a multimodal input, an appropriate input is generated to the processing unit 3 in accordance with the multimodal rule matched.

In this embodiment, the processing system can comprise any processing system which requires a multimodal interface to implement process within a processing unit 3. The functional units can be implemented either partly or wholly in software either on a special purpose machine or a general purpose computer.

A more detailed embodiment of the present invention will now be described with reference to FIGS. 2 to 13.

Figure 2:
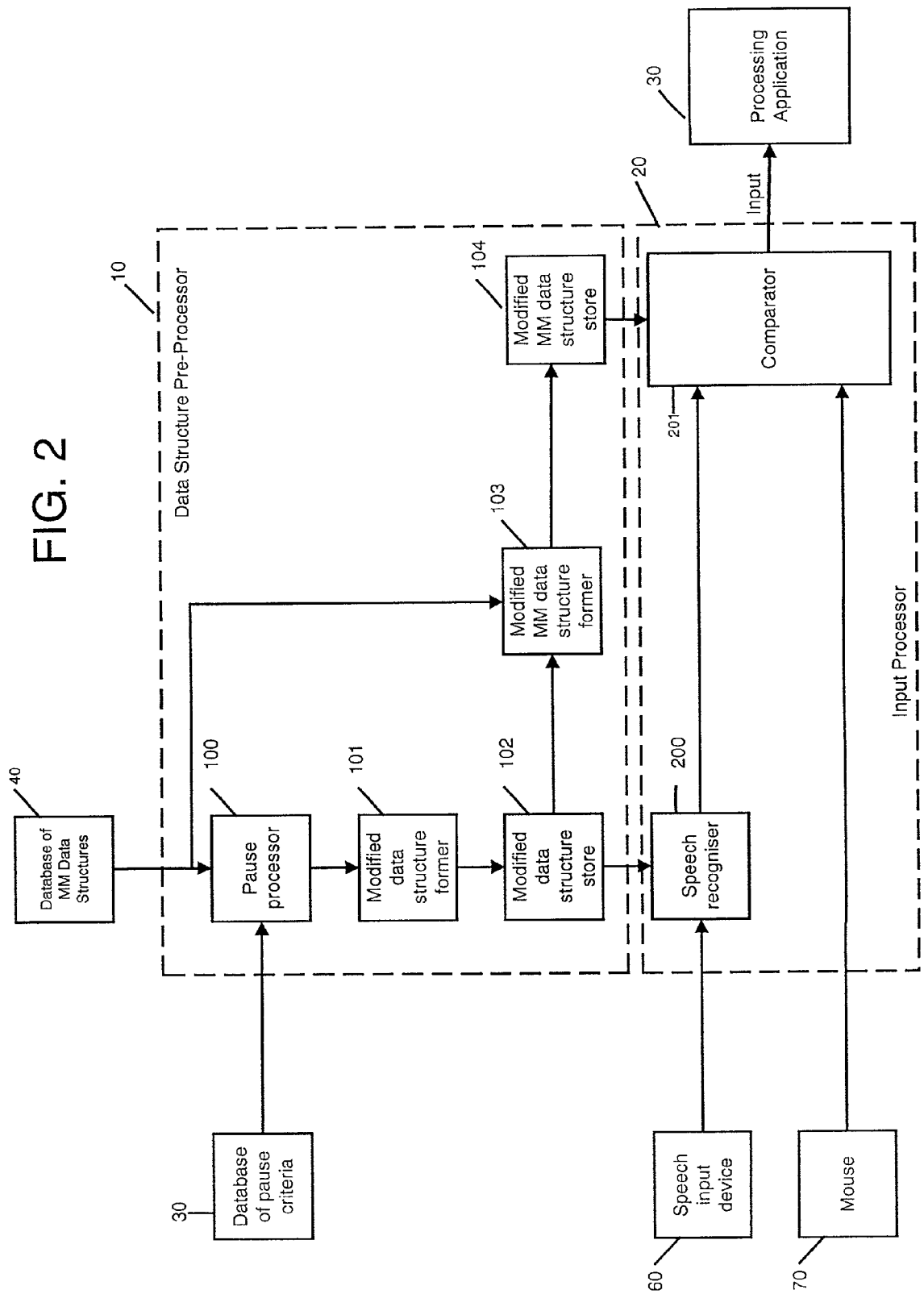
FIG. 2 is a schematic diagram of a second embodiment to the present invention.

FIG. 2 is a functional diagram illustrating a computer system allowing speech input as a first modality and mouse events as a second modality. The input is used to input data and/or instructions to a processing application 30.

A database of multimodal data structures 40 is provided to store a plurality of multimodal rules for defining inputs to the processing application 30. Also a database of pause criteria 50 is provided to store criteria identifying how the second modality events i.e. the mouse clicks can affect the timing of the speech pattern by a user.

This embodiment to the present invention is provided with a data structure preprocessor 10 and an input processor 20 which operate in a similar manner to the data structure preprocessor 1 and the input processor 2 of the previously described embodiment.

The data structure preprocessor 10 includes a pause processor 100 which receives multimodal rules defined by multimodal data structures from the databases of multimodal (MM) data structures 40. The pause processor 100 processes the multimodal rule defined by the multimodal data structure in accordance with the pause criteria read from the database of pause criteria 50. The pause processor 100 inputs markers into the grammar rules to identify the position of pauses. A modified data structure former 101 receives the grammar rules with markers and fragments the marked grammar rules using the markers in order to form sub-grammar rules. The sub-grammar rules are then hierarchically arranged in dependence upon their mutual relationships in order to form modified grammar rules defined by a modified data structure.

A modified data structure store 102 is provided to store the modified data structure. This can then be made available to a speech recogniser 200 as will be described in more detail hereinafter.

The data structure preprocessor 10 also includes a modified multimodal data structure former 103 which receives the input multimodal data structures and reads the modified data structure store 102. The modified multimodal data structure former 103 determines how the mouse events should be associated with each grammar sub-rule within the modified grammar rule of the modified data structure. The modified multimodal data structure former 103 forms a modified multimodal data structure in accordance with the determined associations. A modified multimodal data structure store 104 is provided within the data structure preprocessor 10 for storing the formed modified multimodal data structure.

Thus the data structure preprocessor 10 generates modified data structures and modified multimodal data structures as described hereinabove with reference to the previous embodiment. These are used by the input processor 20 in order to derive an input for the processing application 30.

This embodiment is provided with a speech input device 60 in order to generating a speech signal which is input to a speech recogniser 200. The speech recogniser 200 carries out recognition using the modified data structure read from the modified data structure store 102 provided in the data structure preprocessor 10. The output of the speech recogniser 200 comprises a sequence of recognised words which are input to a comparator 201. Also input into the comparator 201 are mouse events generated by a mouse 70. The comparator compares the multimodal input with the modified multimodal data structures read from the modified multimodal data store 104 in the data structure preprocessor 10. In dependence upon the matching of the input multimodal data with the modified multimodal data structure that input is generated for the processing application 30.

Figure 3:
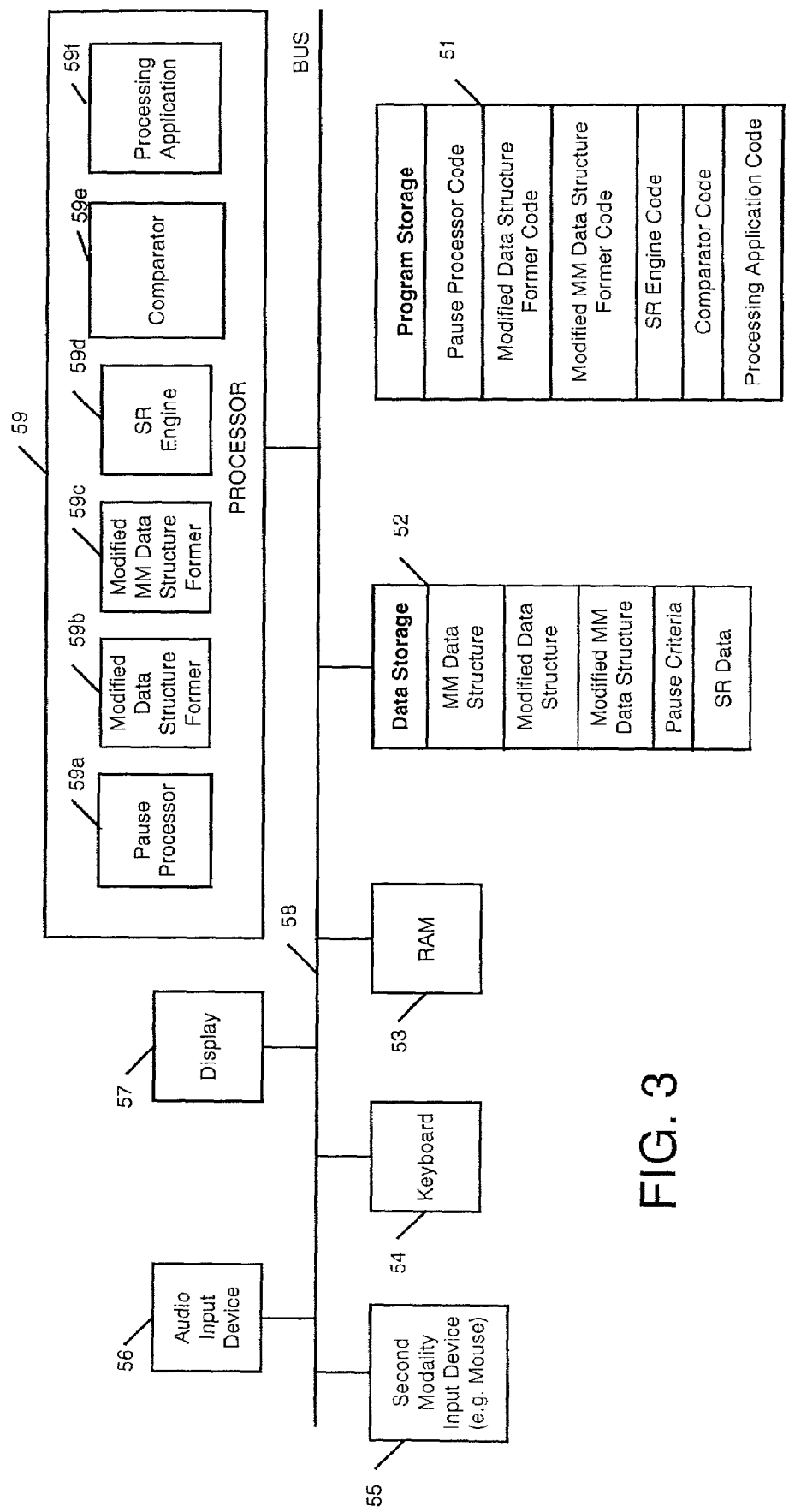
FIG. 3 is a schematic diagram of a general purpose computer for implementing the second embodiment of the present invention.

This embodiment of the present invention is implemented using a general purpose computer and the functional units comprise software modules implemented by a processor. FIG. 3 illustrates the structure of the general purpose computer in more detail.

The computer comprises a processor 59 for implementing program code stored in the program storage 51. When the processor 59 implements the program code, the data which is stored in the data storage 52 is processed. The computer is also provided with conventional random access memory (RAM) 53 for use as working memory by the processor 59.

A keyboard 54 is also provided for conventional keyboard input. A display 57 is provided for providing the user with a visual output. An audio input device 56 is provided to enable a user to input speech as the first modality input. A mouse 57 is provided as the second modality input device. The components of the computer are linked by a control and data bus 58. The processor implements a pause processor 59*a* by implementing pause processor code read from the program storage 51. The processor also implements a modified data structure former 59*b* by implementing the modified data structure former code provided in the program storage 51. The processor further implements a modified multimodal data structure former 59*c* by implementing the modified multimodal data structure former code stored in the program storage 51. The processor also implements a speech recognition engine 59*d* by implementing the speech recognition engine code stored in the program storage 51. Further, the processor 59 implements a comparator 59*e* by implementing the comparator code stored in the program storage 51. Also, the processor 59 implements a processing application 59*f* by implementing the processing application code stored in the program storage 51.

The data storage and program storage can comprise any suitable storage device such as non volatile memory e.g. floppy disk, hard disk, programmable read only memory devices, or optical disks, or volatile memory e.g. RAM.

It can thus be seen from this embodiment of the present invention that the present invention can be implemented by supplying computer code to a general purpose computer to implement the functions. A computer program can be supplied by providing the computer program on any carrier medium such as a storage medium e.g. floppy disk, optical disk, magnetic tape etc. or as a signal e.g. a signal transmitted over a network such as the Internet.

The method of operation of the data structure processor 10 will now be described in more detail with reference to FIGS. 4 to 11.

This embodiment to the present invention will be described with reference to use with a facsimile receipt and transmission processor application.

The multimodal rules are framed in a format which is an extension of the Java Speech Grammar Format (JSGF). The JSGF accompanies the Java speech API (Application Program Interface) as a platform independent method for Java programmers to use conventional speech recognition engines in Java programs. Version 1.0 of the JSGF was released by sun on 26 Oct. 1998. Under JSGF each rule is specified by naming it inside angular brackets (< >) followed by an equal sign (=) and a rule definition. The rule definition is in terms of tokens, where a token is a word which can be spoken or a sequence of words with a single combined meaning e.g. "New York City". The JSGF is extended in the present embodiment to accommodate the second modality i.e. mouse click events. The mouse click events are treated as tokens and the click is considered to be the information content of the token. In order for a processor to recognise which modality this token comes from, the token consisting of "click" is preceded with an exclamation mark (!) which itself is preceded by the modality i.e. "mouse", giving overall "mouse ! click". If two separate mouse channels were employed, then the mouse modalities could be separately identified as "mouse1!click" and "mouse2!click" respectively. When no modality is specified before a token, that token is considered to comprise the speech modality (first modality).

In order to specify how the spoken words are coordinated with mouse clicked events, the "ampersand symbol" (&) symbol is used to indicate that a mouse click event is associated with a particular word or token. By way of an example, in the present embodiment one multimodal rule of the application multimodal data structure is defined as follows:

<fax rule>=
    fax (this & mouse!click) to (him & mouse!click)

Accordingly, for this rule to be satisfied, the word "fax" must be received via the speech modality, then the word "this" must be received by the speech modality in association with a mouse click event via the second modality, then the word "to" must be received via the speech modality and finally the word "him" must be received by the speech modality in association with a mouse click event via the second modality.

In the present embodiment, a mouse click event is defined as being associated with a given word if it occurs at any time after the end of the word preceding the given word and before the start of the word following the given word. This is shown schematically in FIG. 4.

The pause criteria used in this embodiment and stored in the database of pause criteria 50 can comprise a general set of rules which are applicable for generating inputs for any type of processing application. Alternatively, they can be adapted for use with a particular application and corresponding multimodal data structures. In the present example the pause criteria are relatively simply defined and hence can be applied to a range of applications. The pause criteria consist of just one basic rule that is applied uniformly to each rule of the multimodal data structure. The basic pause rule is that a single pause is possible in relation to one or more words of the multimodal rule, provided one or more mouse clicks are associated in accordance with the above described bounded relation to any such words. The single pause is accommodated either directly before or directly after the corresponding words, but there is no possibility accepted of a pause occurring both directly before and directly after the words.

Thus in accordance with this specific implementation of the present invention, the data structure preprocessor 10 implements the pause processor 100, the modified data structure former 101, and the modified multimodal data structure 103 as Java code modules. This enables the speech recogniser 200 to interface to the grammar rules stored in the modified data structure store 102 using JSGF.

The method of implementation of the pause processor 100 and the modified data structure former 101 will now be described with reference to FIGS. 5 to 8.

In step S1 the multimodal data structure defining MM grammar rules are received which comprise speech recognition grammar rules and associated mouse events. The multimodal data structure is read from the database of multimodal data structures 40.

Figure 4:
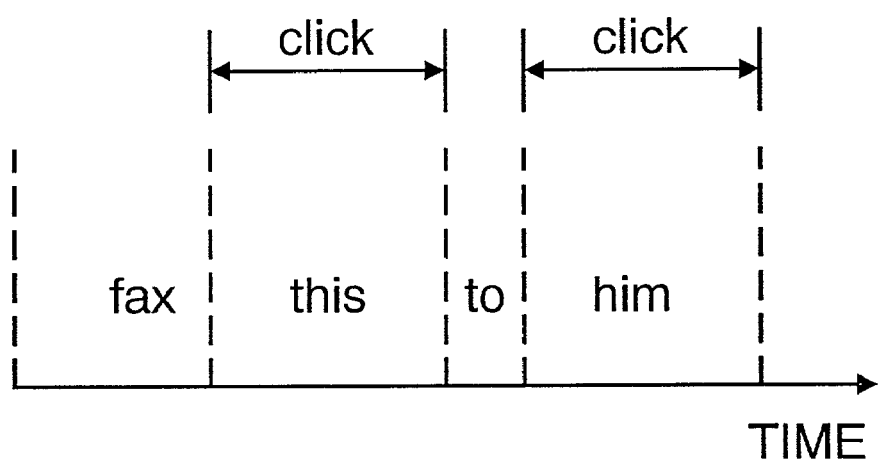
FIG. 4 is a diagram illustrating a multimodal input.
Figure 5:
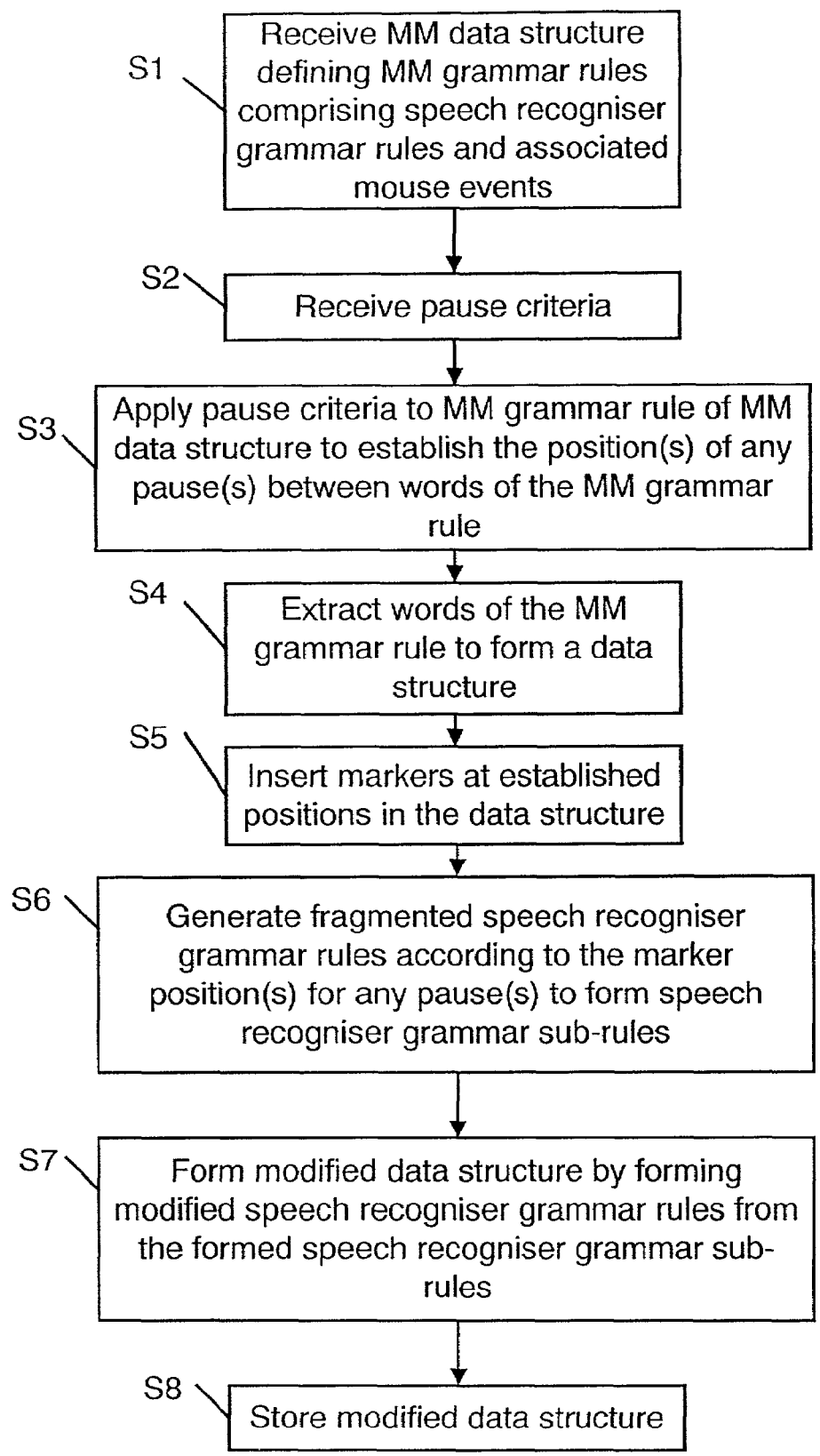
FIG. 5 is a flow diagram illustrating the method of generating the modified data structure in accordance with a second embodiment of the present invention.
Figure 6:
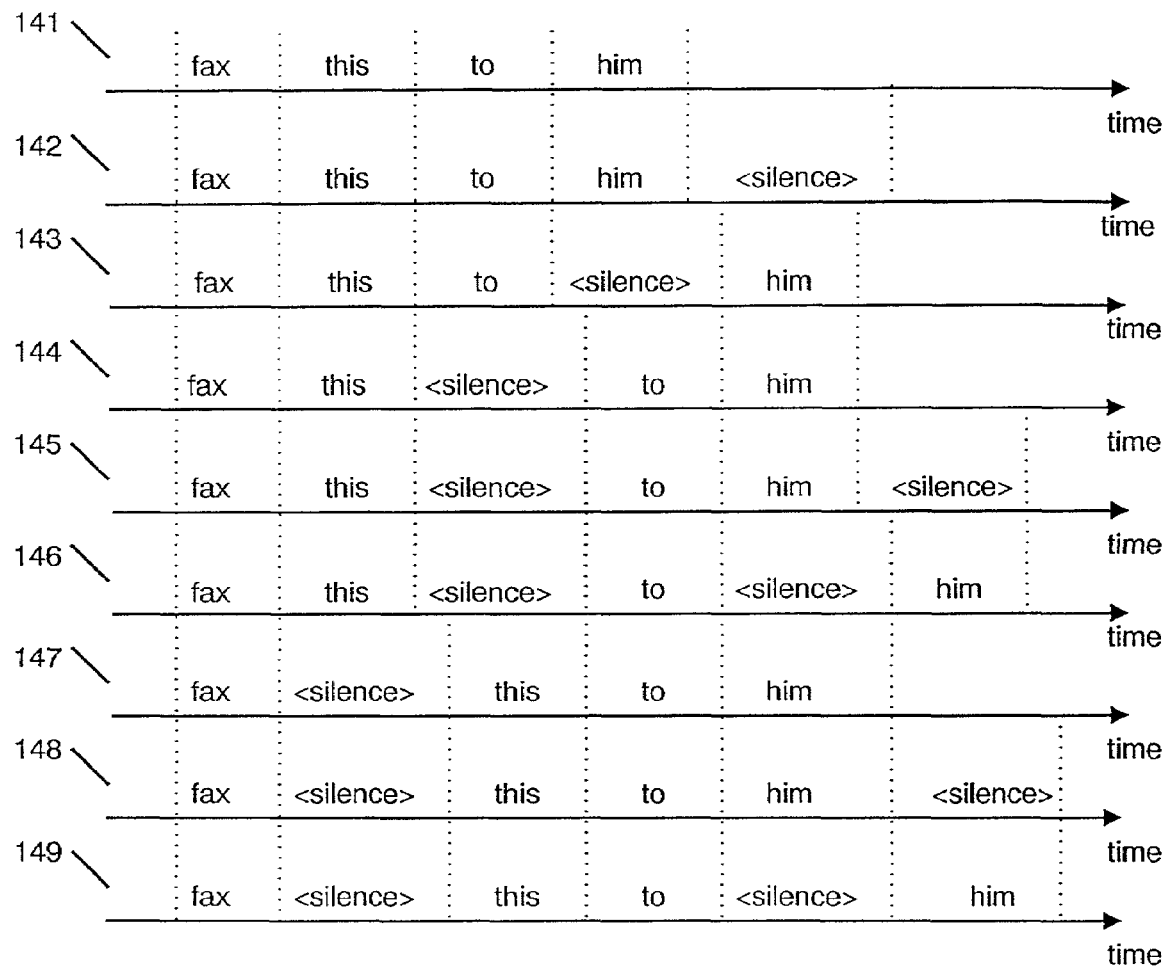
FIG. 6 is a diagram illustrating the marking of pauses within the input data structure.

In step S2 pause criteria are received from the database of pause criteria 50. In step S3 the pause criteria are applied to the multimodal grammar rule of the multimodal data structure to establish positions of any pauses of the words of the multimodal grammar rules. Assuming that the multimodal grammar rule comprises the fax rule mentioned hereinabove and as illustrated in FIG. 4, the pause processor 100 analyses the words of a fax rule to locate any words for which multimodal events are associated. The word "this" is identified and also the mouse clicks associated therewith in the multimodal rule. Thus the pause processor 100 establishes that, in addition to no pause occurring in relation to the word "this", a pause may be located directly before the word "this" or directly after the word "this", giving three separate possibilities. The word "him" is also identified, along with the associated mouse click event. Thus the pause processor 100 establishes that, in addition to no pause occurring in relation to the word "him" a pause may be located directly before the words "him" or directly after the word "him", again giving three separately possibilities.

In step S4 the pause processor 100 extracts the complete chain of words contained in the multimodal rule to form a data structure which is equivalent to a conventional grammar rule usable by an SR engine. In step S5 the pause processor 100 then marks the pauses between the words at the established positions in the data structure. Three such possibilities were established due to the word "this" and three such possibilities were established due to the word "him". Since each possibility for "this" may arise with each possibility for "him", a combination of nine possible arrangements of pause marker positions relative to the word order of the rule arises. Such arrangements are hereinafter referred to as marker configurations, and the nine versions in the present example are shown as items 141 to 149 of FIG. 6, in which the marked pauses are identified by the nomenclature <silence>. Thus in this way a data structure is established which comprises a plurality of strings of words with pause markers. This is input into the modified data structure former 101.

Figure 7A:
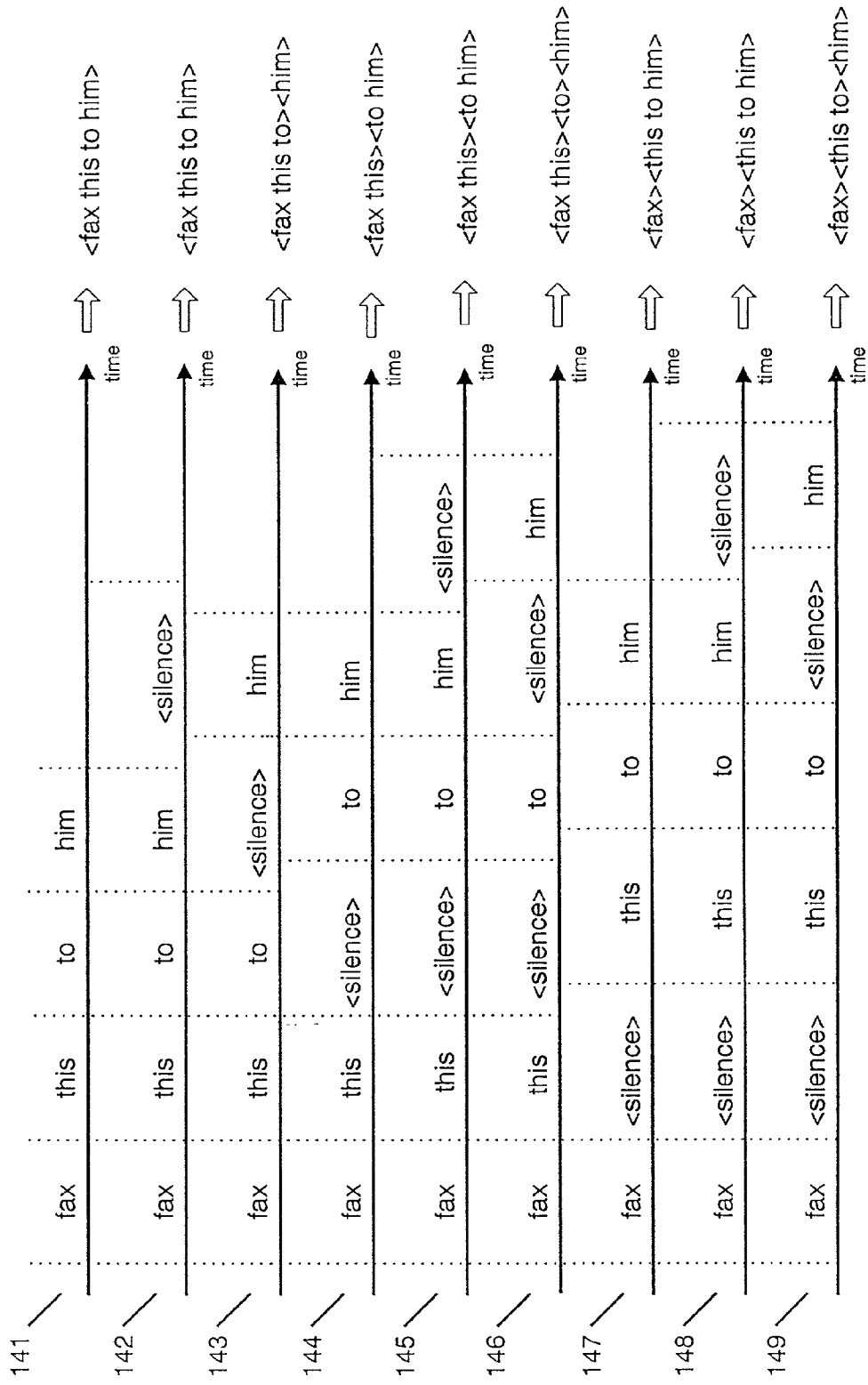

In step S6 the modified data structure former 101 generates fragmented speech recogniser grammar rules according to the marker positions for any pauses to form speech recogniser grammar sub rules. For the fax rule each of the marker configurations 141 to 149 are processed. Fragmentation takes place at the pause marker positions. FIG. 7*a* shows the different speech recogniser grammar sub rules formed from respective marker configurations 141 to 149. Marker configuration 141 contains no pause markers, hence no fragmentation occurs, hence the resulting SR grammar sub-rule is merely the same as the initial rule, i.e. <fax this to him>. Marker configuration 142 has a pause marker at the end of the phrase, hence fragmentation in this case again leads to a SR grammar sub-rule the same as the original rule, namely <fax this to him>. In marker configuration 143, a pause is marker between the words 'to' and 'him'. In this case, since new fragments must be formed in respect of this marked pause, two fragments are formed. The first fragment consists of the words 'fax this to', and the second fragment consists of the word 'him', which fragments form SR grammar the sub-rules <fax this to> and <him>. In marker configuration 144, a pause is marked between the words 'this' and 'to'. Consequently, two further new SR grammar sub-rules are formed from the fragments either side of the pause marker, namely <fax this> and <to him>. Marker configuration 145 is similar to marker configuration 144, but has a further pause marked at the end of the initial grammar SR rule, after the word 'him'. This in fact produces no extra fragments compared to marker configuration 144, consequently the two SR grammar sub-rules produced by fragmenting marker configuration 145 are in fact the same as for 144. In marker configuration 146, there is one pause marked between the words 'this' and 'to', and a further pause marker between the words 'to' and 'him'. The fragments that result provide the SR grammar sub-rules of <fax this>, <to> and <him>. Note that the SR grammar sub-rule <fax this> was also produced from marker configurations 144 and 145, and the SR grammar sub-rule <him> was also produced from marker configuration 143, but the SR grammar sub-rule <to> is a new SR grammar sub-rule which was not produced by any of marker configurations 141 to 145. Marker configuration 147 has just one pause which is marked between the words 'fax' and 'this'. Fragmentation here results in two new SR grammar sub-rules, namely <fax> and <this to him>. Marker configuration 148 is similar to 147 but has an additional pause marked after the word 'him'. This however produces the same fragments as described for marker configuration 147. Finally marker configuration 149 includes a pause marker between the words 'fax' and 'this', and a pause marked between the words 'to' and 'him'. This provides three fragments providing three SR grammar sub-rules which are <fax>, <this to> and <him>. Of these three SR grammar sub-rules both <fax> and <him> are replications of SR grammar sub-rules produced by previous marker configurations 141 to 148, whereas <this to> is a further new SR grammar sub-rule.

The above described process produces a number of SR grammar sub-rules. In the present case nine such different SR grammar sub-rules have been produced, and these are shown in FIG. 7*b*. It is important to note that the above described procedure does not merely represent each combination of dividing the four words contained in the phrase 'fax this to him'. That process would instead have produced a further possibility of the word 'this', which does not appear in the SR grammar sub-rules shown in FIG. 7*b*. It is to be appreciated that more complicated standard SR grammar rules will typically produce a significantly smaller number of SR grammar sub-rules relative to the total number of permutations of words.

The above processes are repeated for each multimodal rule used for generating an input for the processing application 30.

At step S7, the modified data structure former 101 forms a modified SR grammar rule defined by a modified data structure from the SR grammar sub-rules. This process comprises implementing the logical relationship between the different SR grammar sub-rules, i.e. in the case of the present fax rule, the relative sequences as indicated on the right hand side of FIG. 7*a*. This is further illustrated for the case of the present fax rule in FIGS. 8*a* and 8*b*, where FIG. 8*a* repeats the content of the right hand side of FIG. 7*a* except that identical outcomes from different marker configurations are not duplicated, and secondly the sub-rules are presented in their labelled form, e.g. <SR sub-rule 1> rather than <fax this to him>. A vertical line represents the "or" symbol. FIG. 8*b* represents the content of FIG. 8*a* except that further use is made of the "or" symbol consisting of a vertical line. The above described process is repeated for each multimodal rule for generating an input for the processing application to form respective modified SR grammar rules defined by the modified data-structure.

At step S8, the modified 25 data structure is input into the modified data structure store 102.

Figure 9:
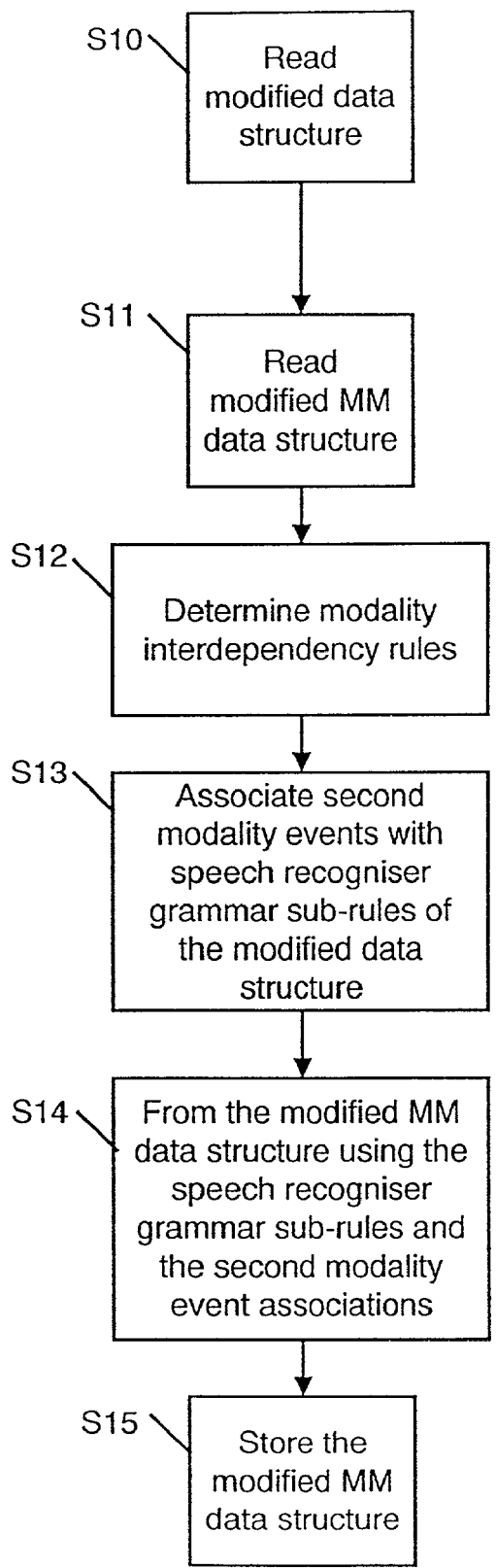
FIG. 9 is a flow diagram illustrating the generation of the modified multimodal data structure.
Figure 10:
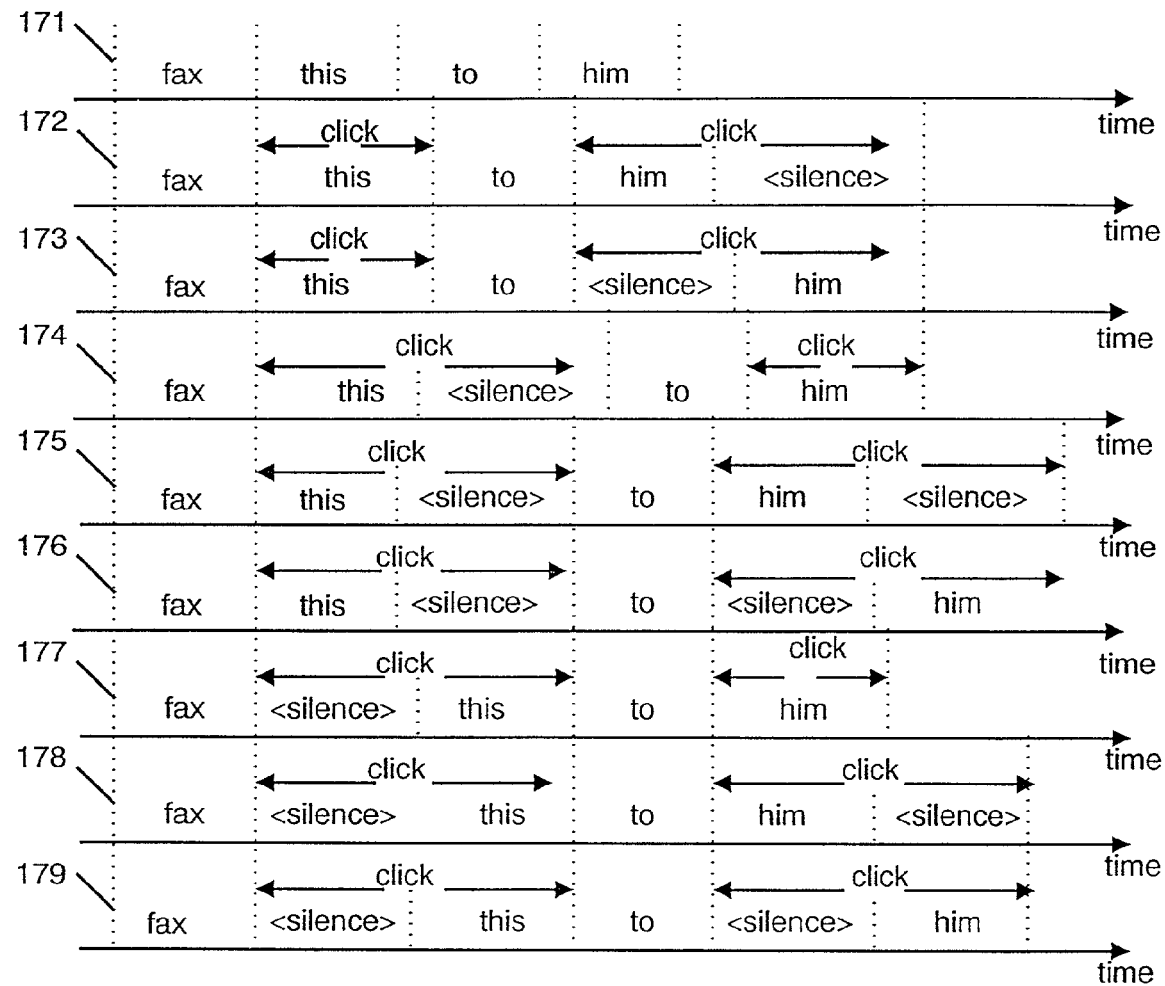
FIG. 10 is a diagram illustrating the input multimodal data structure.

Details of the processing steps involved in forming the modified multimodal, data structure will now be described with reference to the flow diagram of FIG. 9.

In step S10, modified data structure store 102 is accessed and the modified data structure is input into the modified multimodal data structure former 103.

In step S11, the multimodal data structure database 40 is accessed and the multimodal data structure is also input into the modified multimodal data structure former 103.

In step S12, the modified multimodal data structure former 103 determines a set of modality interdependency rules by analysing the relationship specified between the two modalities in the multimodal data structure. For example, in the case of the fax rule described above, the modified multimodal data structure former 103 determines that one mouse click event is required in association with each of the two words "this" and " him".

As mentioned earlier, under the bounded relationship, the timing of the mouse click associated with a given word is specified to be at any time after the end of the word preceding the given word and before the start of the word following the given word. Referring now to the pause positions employed-informing the modified speech recogniser data structure, it is to be appreciated that the timing definition of the mouse clicks results in those mouse clicks also being allowed to take place during the pauses associated with the words, as shown schematically in FIG. 10, where mouse click configurations 171 to 179 show the mouse click timing relationship as applied to marker configurations 141 to 149 respectively.

Referring again to FIG. 9, at step S13, the modified multimodal data structure former 103 associates the second modality events i.e. mouse clicks as specified by the interdependency rules with the SR grammar sub-rules, thereby forming a multi-modal sub-rule in correspondence with each SR sub-rule.

In the case of the fax rule, for example, the first sub-rule is initially selected, i.e. SR sub-rule 1. At step S13 it is determined whether the modality interdependency rules define any association of a mouse click event with the words 'fax this to him' of SR sub-rule 1. Referring to FIG. 4 it can be seen that two separate mouse clicks are indeed required with this SR grammar sub-rule, hence two mouse clicks are associated with selected SR sub-rule 1, as shown by item 191 of FIG. 11. Next, SR sub-rule 2 is selected. SR sub-rule 2 contains the words 'fax this to', hence referring to FIG. 4 it can be seen that only one mouse click, corresponding to the word 'this', is specified to take place in association with SR sub-rule 2. Consequently at step S13 only one mouse click is associated with SR sub-rule 2, as shown by item 192 of FIG. 11. The process is repeated for each grammar sub-rule from SR sub-rule 1 to SR sub-rule 9. SR sub-rule 3 contains only the word 'him', for which one mouse click only is required, hence providing the association shown as item 193 in FIG. 11. SR sub-rule 4 contains the words "fax this", hence one mouse click is required due to the word 'this', resulting in association with one mouse click as shown by item 194 in FIG. 11. Similarly, SR sub-rule 5 results in association with one click as shown as item 195 in FIG. 11, this being derived from the word 'him'. However, SR sub-rule 6 contains only the word 'to' which does not have any mouse click specified therewith (see FIG. 4). Consequently as shown by item 196 of FIG. 11, no association with a mouse click is allocated by the modified multimodal data structure former 103 to SR sub-rule 6. The only word contained by SR sub-rule 7 is the word 'fax' which also has no mouse clicks therewith. SR sub-rule 8 contains the words 'this to him', hence it has two mouse clicks associated therewith. SR sub-rule 9 contains the words 'this to', hence the mouse click associated with the word 'this' is associated with SR sub-rule 9. The above process is repeated for each rule of the modified sub-rule data structure.

In step S14, the modified multimodal data structure former 103 forms a modified multimodal data structure comprising the SR sub-rule 2 and the second modality (i.e. mouse click) event associations derived for all the rules. At step S15, the modified multimodal data structure is input to the modified multimodal data structure store 104. The form of the modified multimodal data structure is illustrated in FIG. 12.

Thus the data structure preprocessor 10 generates both a modified data structure holding modified grammar rules for use by the speech recogniser 200 and also a modified multimodal data structure for use in the analysis of the multimodal input by the comparator 210 in order to generate an input for the processing application 30.

Figure 13A:
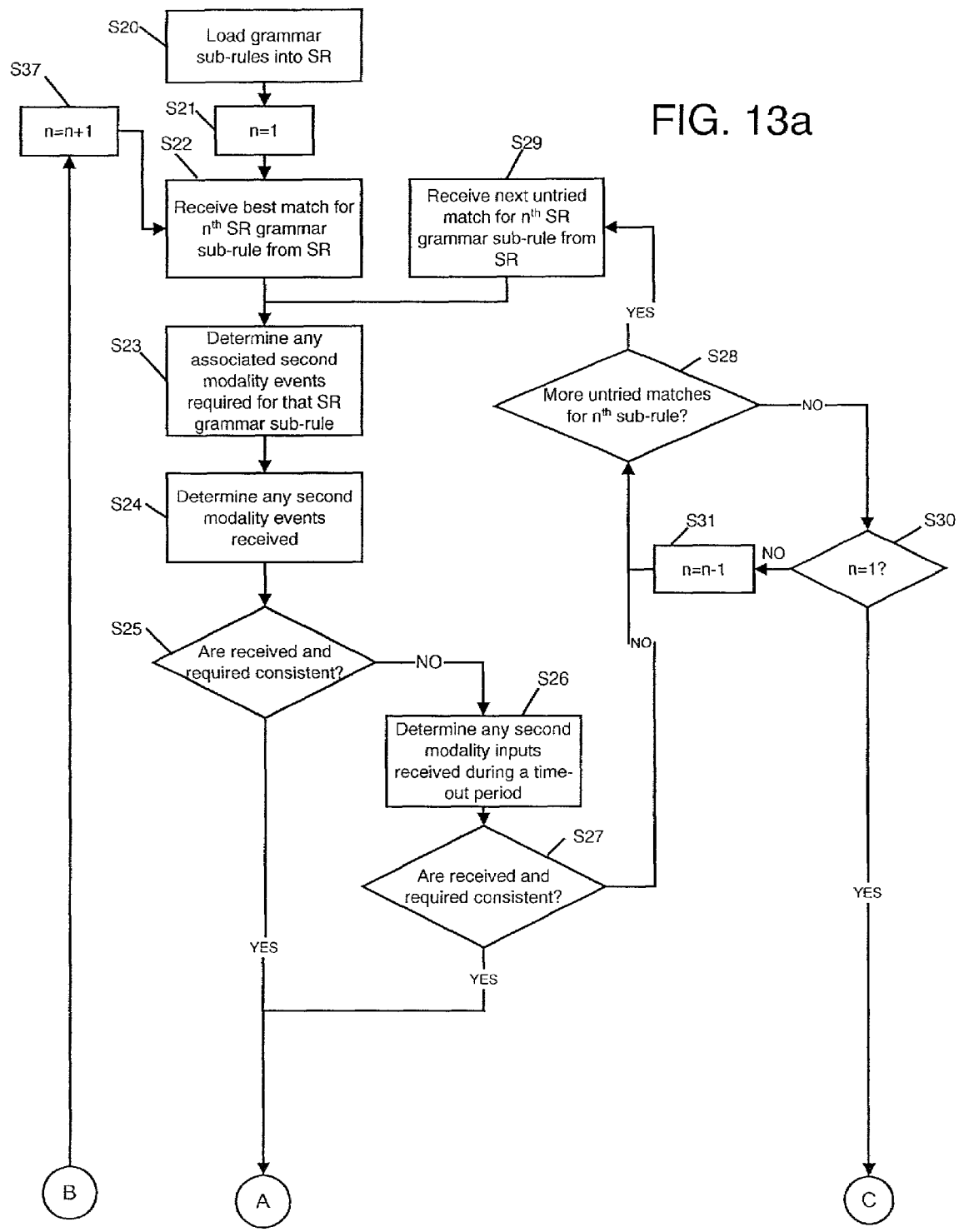
FIGS. 13a and 13b are a flow diagram illustrating the generation of computer usable data from a multimodal input.
Figure 13B:
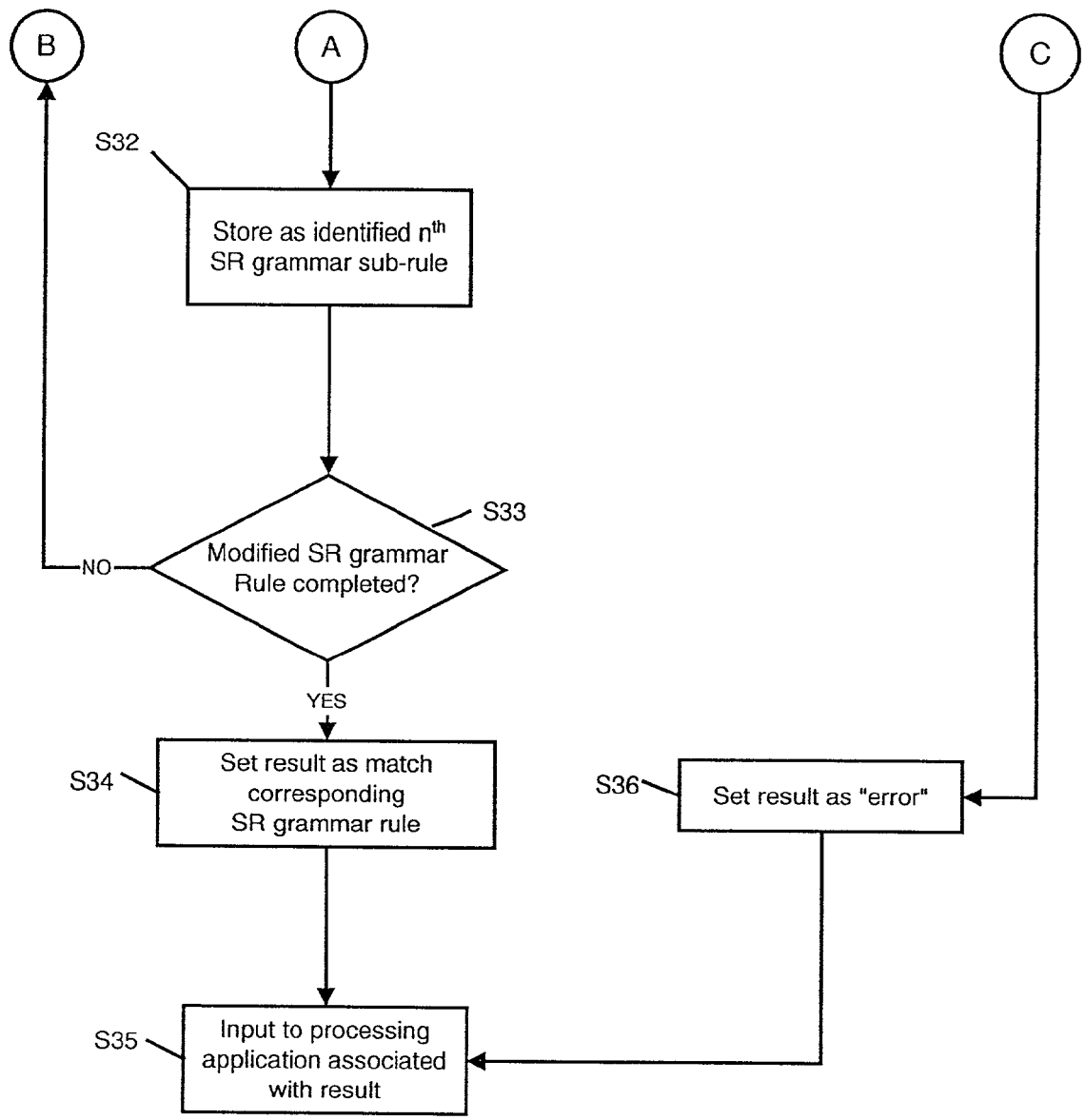

Details of the processing steps carried out by the comparator 42 during the operation of the input processor 2 will now be described with reference to the flow diagram of FIGS. 13a and 13b.

In step S20, the grammar sub-rules in the modified data structure are loaded into the speech recogniser (SR) 200. In step S21 a grammar rule counter n is set to 1. The grammar rule counter determines the position of a sub grammar rule in a sequence for computing the modified SR grammar rule. FIG. 8b shows the modified SR fax rule organised into four alternatives where each alternative has a unique SR grammar sub-rule at its logical start (n=1). In the case of the first alternative, for recognition of the whole modified SR fax rule to take place, <SR sub-rule 1> needs to be recognised. In the case of the second alternative, <SR sub-rule 2> needs to be recognised following which <SR sub-rule 3> needs to be recognised. This is represented by the second line in the equation form of FIG. 8b. In the case of the third alternative, <SR sub-rule 4> needs to be recognised followed by the indicated variations with respect to <SR sub-rule 5>, <SR sub-rule 6> and <SR sub-rule 3> being recognised. This is represented by the third line of the equation form of FIG. 8b. In the case of the fourth and last alternative of the present example, <SR sub-rule 7> needs to be recognised, followed by the indicated combinations of <SR sub-rule 8>, <SR sub-rule 9> and <SR sub-rule 3> being recognised. This is represented by the fourth and final line of the equation form of FIG. 8b. Thus in the example shown in FIG. 8b, there are four first SR grammar sub-rules (n=1), namely SR sub-rules 1, 2, 4 and 7. One of these will be given by the SR as the best match in step S22.

The procedure will now be described for the case when, for the modified SR fax rule, the best match given for a starting rule is SR sub-rule 2, containing the words 'fax this to'. At step S23, comparator 201 determines any associated second modality events required for that SR grammar sub-rule. The comparator 201 determines, from the modified multimodal data structure it has received, the requirement that for SR sub-rule 2 one mouse click is required to have been input during the corresponding time portion of the audio input that provided the recognition result.

At step S24 the actual mouse click inputs by the operator using mouse 70 are analysed by the comparator 201 to determine which, if any, of said events occurred in the time period corresponding to the relevant audio input. At step S25, the comparator 201 determines whether the above described required mouse click events are consistent with the actual received events. If they are not consistent, then the comparator 201 allows a time out period to allow for input not yet properly processed, or in the case a mouse click due to appear at the end of a-pause, not yet received. After expiration of the time-out period, at step S27 the comparator 201 once again carries out a determination step as to whether the received and required mouse click inputs are consistent. If they are still not consistent then at step S28 it determines whether there are any further candidate untried matches for the initial SR grammar sub-rules. If there are none, in step S30 it is determined if the SR grammar sub-rule being processed is the first in the sequence and if so then at step S36 the output result is set as "error". If the SR grammar sub-rule being processed is not the first in the sequence, in step S31 a previous SR grammar sub-rule is tried and in step S28 it is once again determined if all matches have been tried.

If at step S28 there are further best matches of SR grammar sub-rules which have not been tried, then the comparator 201 receives the next best match for an $n^{th}$ SR grammar sub-rule from the speech recogniser 200 in step S29, and the process returns to step S23.

In the above described procedure, if at step S25 or step S27 the received and required second modality events were in fact consistent, then at step S32 the $n^{th}$ SR grammar sub-rule thus processed is stored as a currently identified $n^{th}$ SR grammar sub-rule. Thus in the present example, SR sub-rule 2 containing the words 'fax this to' is so identified.

At step S33 the comparator 201 determines whether a modified SR grammar rule is completed with the identified $n^{th}$ SR grammar sub-rule. In the present example of the modified SR fax rule, had SR sub-rule 1 been identified as the correct starting SR grammar sub-rule then indeed the overall modified SR fax rule would have been satisfied. In this case the next step would have been S40 in which a result is set as matched to the corresponding SR grammar rule. However, in the present example SR sub-rule 2 does not fulfill the complete modified SR grammar rule, and hence the process moves to step S37 in which n is incremented. The process then returns to step S22 to receive the best match for the next SR grammar sub-rule in the sequence.

In the present case where the initial SR grammar sub-rule (n=1) is SR sub-rule 2, if SR sub-rule 3 is the best match for the next SR grammar sub-rule (n=2), at step S23, the comparator 201 determines from the modified multimodal data structure whether any mouse click events are required for SR sub-rule 3. It will be determined that one mouse click is required during the time period of the audio input that has been recognised as SR sub-rule 3.

At step S24, the comparator 201 determines whether any such mouse click event was indeed received from the mouse 70 during the appropriate time. At step S25, the comparator 201 determines whether the received and required versions are consistent. If not, then the comparator 201 allows a time-out period to receive any outstanding mouse click events to be processed or received, and thereafter at step S26 determines whether any such events have been received during the time-out period. At step S27 the comparator 201 determines whether the updated version of the received results is now consistent with the required results. If not, then at step S28 it is determined whether there are further untried matches for this next SR grammar sub-rule (n=2). If so, in step S29 the next best match for this next SR grammar rule is received from the speech recogniser 200 and the process returns to step S31. Thereafter the process is repeated as described above.

If at S28 there were instead no more untried matches for this next SR grammar sub-rule (n=2) available from the speech recogniser 200, then in terms of the overall procedure the currently identified starting SR grammar sub-rule is inadequate. Consequently the comparator 201 attempts to identify a more suitable preceding SR grammar sub-rule by decrementing the counter n (step S31) and returning to step S28, where it first determines whether any untried matches for the preceding SR grammar sub-rule are available. If they are, then the overall process is repeated starting again at step S29, i.e. a next best match for the preceding SR grammar sub-rule is received and the process continued from there.

If at step S30 no more matches of initial SR grammar sub-rules are available, in other words all combinations of matches of initial SR grammar sub-rules and consequential following SR grammar sub-rules have been exhausted, then at step S36 the result is set as 'error'. This would mean that no satisfactory speech recognition result has been achieved that is also consistent with the received mouse click events.

Returning now to the processing of the best match for the next SR grammar sub-rule (n=2), if at either of steps S25 or S27 it is determined that the received and required results are in fact consistent, then the next step carried out is S32, in which the next SR grammar sub-rule (n=2) whose recognition result has been determined as consistent is stored as the currently identified $2^{nd}$ ($n^{th}$) SR grammar sub-rule.

At step S33, it is determined whether the currently identified initial SR grammar sub-rule followed by the currently identified second SR grammar sub-rule together form a completed modified SR grammar rule. In the present example where the currently identified initial SR grammar sub-rule is SR sub-rule 2 and SR sub-rule 3 has since been identified as the next SR grammar sub-rule, then the whole modified SR fax rule is indeed completed since SR sub-rule 2 followed by SR sub-rule 3 represents the second alternative shown in FIG. 8b. If, however, in another example SR sub-rule 4 was identified as the currently identified initial SR grammar sub-rule, and thereafter SR sub-rule 5 was identified as the currently identified next SR grammar sub-rule, then, as can be seen from the third alternative of FIG. 8b, the result so far is favourable, but nevertheless a further following SR grammar sub-rule, namely SR sub-rule 3, is still required to complete the modified SR fax rule consisting of SR sub-rule 4 followed by SR sub-rule 6 followed by SR sub-rule 3. In this case the process would return to step S37 to increment n and then return to step S22. Then, so long as speech recogniser 200 provides a recognition result for SR sub-rule 3 as the best match of a third SR grammar sub-rule, the process will continue again from S23 to verify the consistency of that recognition result with the corresponding mouse click event received.

After the comparator 201 determines, at step S33, that a modified SR grammar rule has been completed, at step S34 it sets the result as matched to the corresponding modified SR grammar rule.

The final step is that shown at S35, in which the result, be it a successful match via step S34 or an "error" message via step S36, is used to generate an input for the processing application 30. The input can be data provided by the multimodal input and/or instructions as interpreted in accordance with the modified multimodal grammar rules.

It can thus be seen that this specific embodiment provides for improved speech recognition when using a multimodal input since the second modality can be used to improve the speech recognition result by predicting when pauses may be inserted in the first modality input whilst inputting data using the second modality. The search of the possible matching sub-grammars is achieved as illustrated in FIGS. 13a and 13b using a process to search the "tree structure" of the sub-grammar rules. Branches from initial sub-grammar rules to next sub-grammar rules can be explored and if not successful, a new initial grammar can be tried together with the branches therefrom to next sub-grammar rules.

In the above described detailed embodiment, the pause criteria consisted of the simple general rule that a single pause is accommodated either directly before or directly after a word or words provided one or more mouse clicks are associated in the bounded relation to the word or words. Even when maintaining such a simple form of pause criteria specification, a number of variations are possible. One detail in the above embodiment was that it was not possible for a pause to occur both directly before the word and directly after the word. However, in an alternative embodiment, the pause may indeed occur both directly before and directly after the word.

In the above embodiment the same pause criteria is applied to all of the rules of the application multimodal data structure. In other embodiments different pause rules can be set for different rules of the multimodal data structure. Different pause rules could be ascribed based on the classification of the type of rule in the multimodal data structure.

All of the above alternatives broadly speaking represent a type of automatic pause criteria specification in which the required operations are predetermined. In other embodiments, in addition to or instead of such automatic pause criteria, customised pause criteria can be input by an operator as required. Such input by an operator may be made available either on a rule by rule basis, or as a customised input that is applicable to all of the rules. Certain pause criteria can be input based on a response of a user to a query, where the response to the user is in a format understood by the user and which does not specifically detail anything about the pause criteria process as such. For example the application may present a number of queries such as 'do you wish speech processing to allow long pauses when making mouse clicks?'. Alternatively, combinations of automated and customised pause criteria can be formulated by the processor using algorithms employing historical data taken whilst monitoring a user's use of such a system and adapting the pause criteria to the particular traits of a particular user. Such trait matching could also be achieved by a profile input by a user.

In the above embodiment, individual words of the natural language, i.e. English, form the basis of the pause criteria in the view of the use of mouse clicks to identify details related to the spoken words. In other embodiments, key types of word or data blocks that generally are associated with mouse click events could be used. Furthermore, when the second modality is another modality other than mouse clicks, this may in itself lead to particular types of grammar structure or units being the likely causes of pauses.

Indeed, "events" other than pauses, in the natural language modality, may be used as the basis for splitting grammar rules of a speech recognition data structure into modified grammar rules of a modified speech recognition data structure. Any events similar or equivalent to pauses, or causing similar or equivalent effects to those caused by pauses, may be specified instead of or as well as pauses. One example is predetermined words e.g. "this" and "him", which may for example be expected in combination with an input or event of the second modality. Alternatively, a category or categories of word, e.g. pronouns, may be specified. Another example is voice sounds which might be uttered by a speaker between meaningful words, e.g. "err", "umm" and "hmm".

In the above embodiment a bounded relationship was employed to define an association between a multimodal event and spoken word. In other embodiments, different definitions can be specified. One possibility is that the mouse click event must occur whilst the word is actually being spoken.

In the above embodiment the entire modified data structure is entered into the speech recogniser from the modified data structure store 102 prior to the speech recogniser 200 processing speech input. Alternatively as standard Speech Application Programmer's Interface (SAPI) is used, enabling just a portion of the modified data structure to be transferred initially to the speech recogniser 200 then based on feedback results from the speech recogniser 200 to a processor controlling the modified data structure store 102, further parts of the modified data structure are transferred to the speech recogniser 200 as required. In the latter embodiment, for example, for the case of the SR fax rule only the starting SR grammar sub-rules, i.e. sub-rules 1, 2, 4 and 7 are transferred initially to the speech recogniser. Then, depending upon the progress of the procedure shown in FIGS. 13*a* and 13*b*, particular following SR grammar sub-rules are transferred to the speech recogniser 200 as required. A further alternative is that all the modified data structure is transferred to the speech recogniser 200 initially, but only some of the SR grammar sub-rules are initially activated within the speech recogniser.

In the above described specific embodiment, timing details of the words recognised by the speech recogniser 200, more particularly a start time and an end time, are used in conjunction with the time record of the mouse click events to determine whether the required association had occurred. In another embodiment, instead of an absolute time basis, the association can be based merely on the required sequential number of second modality events occurring e.g.

speech input: fax this to him
mouse input: click click

In other embodiments the processing operations are implemented in systems other than the computer arrangement described. For example, the speech recogniser can be a completely separate entity from other processing units. Similarly, the data structure preprocessor 1 may be arranged in a different module to the input processor 2. Indeed, any of the above described functions can be implemented in a suitable type of processing arrangement, including distributed arrangements.

In other embodiments, other modalities other than mouse clicks can form the second modality. Possibilities include keyboard input, gestures, for example via suitable video camera inputs, in particular pointing, touch screen inputs, and so on. Also, more than one modality other than speech can be accommodated. For example, in addition to the first modality of speech, a second modality consisting of mouse click events and a third modality consisting of gestures can be included. Also, two different channels of a similar type of modality can be accommodated, for example right mouse button clicks and left mouse button clicks.

The first modality need not be speech, rather it is merely limited to being any input in the form of a natural language which is to be recognised using grammar rules and for which the temporal relationship of tokens e.g. words is important. For example, sign language as used by deaf people could form the first modality in another embodiment of the present invention.

The above embodiments provide improvements in accommodating pauses that arise in a natural language input due to the interaction with further modalities other than that conveying the natural language input. Fundamentally, the further modalities impose restrictions on the proper flow of the natural language input and can affect the recognition result for the natural language input modality.

In its broadest aspects the present invention is not limited to multimodal inputs. The present invention is also applicable to a single modal input comprising a natural language input which is to be recognised using grammar rules and for which the temporal relationships between tokens e.g. words is important. A primary example of such an input is speech although another example is sign language.

For such an input, a user may insert pauses inadvertently either when emphasising something or due to a particular style of input e.g. particular style of speech. The present invention is capable of compensating for this by generating modified grammar rules in the form of a modified data structure for use by the input recognition engine.

An embodiment receiving a single modal input will now be described with reference to FIGS. 14 and 15. This embodiment is able to generate modified speech recognition grammar rules to take into account pauses inserted by a user. In a conventional speech recognition engine, when recognition is carried out on speech in which pauses occur other than at the end of a sentence, incorrect recognition can result.

Figure 14:
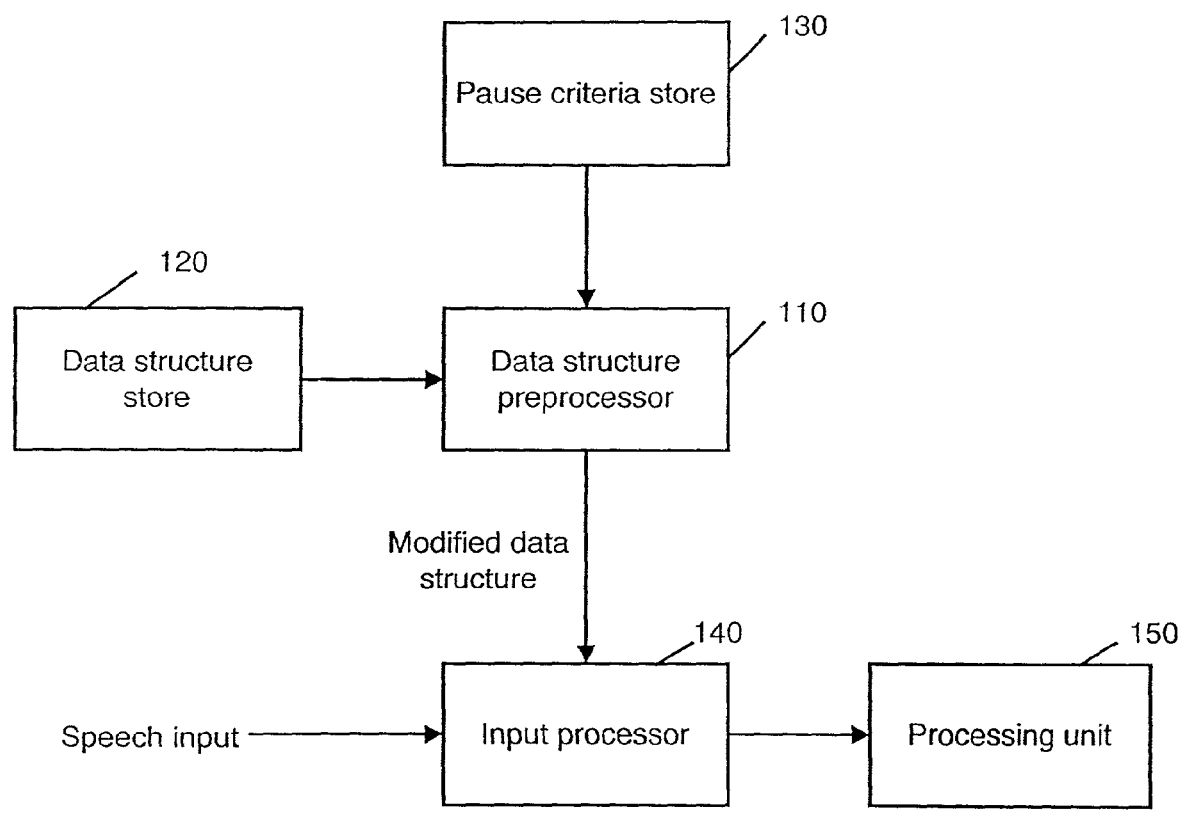
FIG. 14 is a schematic diagram of a third embodiment of the present invention.
Figure 15:
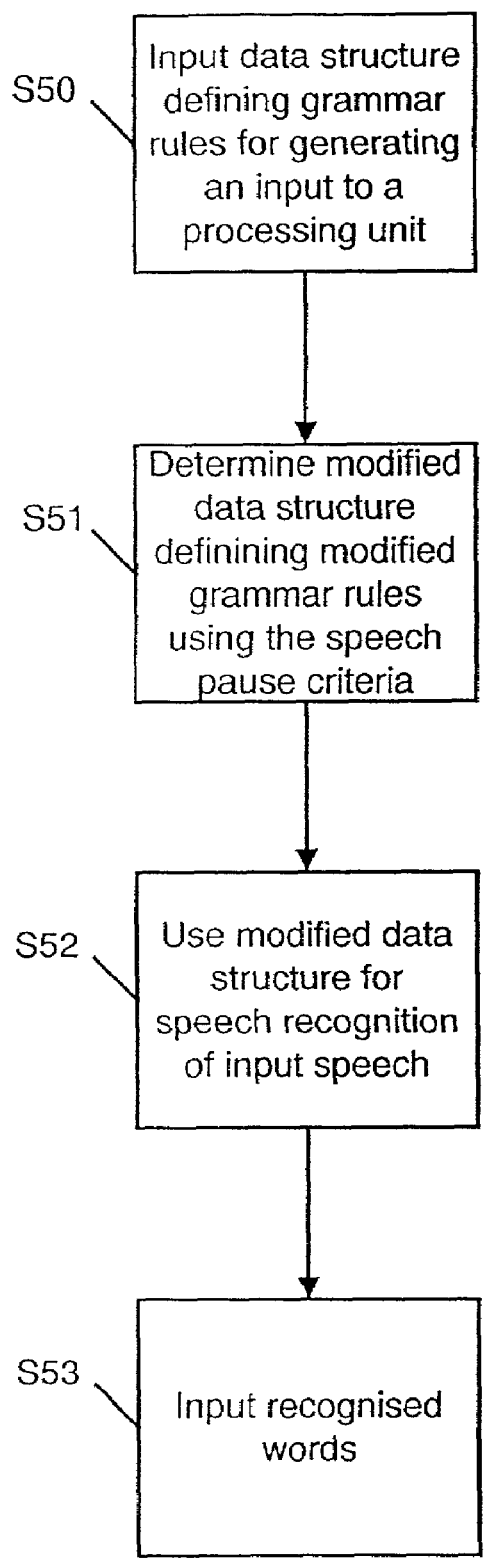
FIG. 15 is a flow diagram illustrating the operation of the third embodiment of the present invention in generating computer usable data in the form of units in the natural language i.e. words.

Referring now to FIG. 14, a data structure store 120 is provided to store a data structure defining a speech recognition grammar. A pause criteria store 130 is provided to store criteria for defining where pauses can occur in the grammar rules.

A data structure preprocessor 110 is provided for reading SR grammar rules from the data structure store 120 and pause criteria from the pause criteria store 130. Using the pause criteria, the data structure can be modified for use by a speech recognition engine which is provided in an input processor 140. For speech recognition engines which can accept tokens defining silence, the modified data structure generated by the data structure preprocessor 110 can simply comprise the speech recognition grammar read from the data structure store 120 with the pause or silence markers inserted therein. Alternatively, for speech recognition engines which do not recognise tokens identifying pauses or silence, the data structure preprocessor 110 can carry out a further grammar rule modification step of fragmenting the grammar rules into speech recognition grammar sub-rules as described hereinabove with regard to the embodiment concerned with multimodal grammar rules. Thus, the speech recognition engine within the input processor 140 can be provided with speech recognition grammar sub-rules. This will enable the speech recognition engine to more accurately carry out recognition on input speech. Thus the input processor 140 is able to more accurately generate an input for a processing unit 150 to receive the result of the speech recognition e.g. data and/or commands.

The method of operation of this embodiment to the present invention will now be described with reference to the flow diagram of FIG. 15.

In step S50 the data structure defining grammar rules for generating an input to a processing unit is input from the data structure store 120. In step S51 a modified data structure defining fragmented or marked grammar rules is determined using the speech pause criteria read from the pause criteria store 130. In step S52 the modified data structure is used by the speech recognition engine to recognise input speech and in step S53 the recognised words are input into the processing unit 150 either as data or commands.

Although the present invention has been described hereinabove with reference to specific embodiments, the present invention is not limited to these embodiments and it will be apparent to a skilled person in the art that modifications can be made without departing from the spirit and scope of the present invention.

What is claimed is:

1. Data processing apparatus comprising:
receiving means for receiving a data structure defining grammar rules for recognition of a natural language input;
analysing means for analysing the data structure to identify positions in the grammar rules at which pauses can occur in the natural language input; and
generating means for generating a modified data structure defining modified grammar rules for recognition of a natural language input with pauses therein,
wherein said generating means is adapted to fragment the grammar rules in accordance with said identified positions to generate sub grammar rules to form said modified data structure.

2. Data processing apparatus according to claim 1, wherein said analysing means is adapted to identify the positions in accordance with pause criteria for the natural language input.

3. Data processing apparatus according to claim 1 or claim 2, wherein said generating means is adapted to add marker means to the identified positions in the grammar rules at which pauses can occur in the natural language input to generate the modified data structure.

4. Data processing apparatus according to claim 1, wherein said generating means is adapted to form a hierarchical structure using said sub grammar rules to form said modified data structure.

5. Data processing apparatus according to claim 1 or 2, wherein said receiving means is adapted to receive a data structure defining grammar rules for use in speech recognition of a natural language speech input, and said generating means is adapted to generate said modified data structure defining modified grammar rules for speech recognition of a natural language speech input with pauses therein.

6. Data processing apparatus comprising:
receiving means for receiving a data structure defining grammar rules for recognition of a natural language input;
analysing means for analysing the data structure to identify positions in the grammar rules at which pauses can occur in the natural language input; and
generating means for generating a modified data structure defining modified grammar rules for recognition of a natural language input with pauses therein,
wherein said receiving means is adapted to receive said data structure defining grammar rules for recognition of a natural language input as a first modality input in conjunction with associated events in at least one further modality input, said data structure defining the association between events in each modality input, and events in said first modality input comprising units in the natural language.

7. Data processing apparatus according to claim 6, wherein said analysing means is adapted to identify said positions in the grammar rules based on events in at least one said further modality input.

8. Data processing apparatus comprising:
receiving means for receiving a data structure defining grammar rules for recognition of a natural language input;
analysing means for analysing the data structure to identify positions in the grammar rules at which events in at least one further modality input can occur in the natural language input as a first modality input; and
generating means for generating a modified data structure defining modified grammar rules for recognition of a natural language input as the first modality input in conjunction with associated events in a said further modality input, said data structure defining the association between events in each modality input, and events in said first modality input comprising units in the natural language.

9. Data processing apparatus according to claim 8, wherein said analysing means is adapted to identify positions in the grammar rules at which pauses can occur in the natural language input based on events in at least one said further modality input.

10. Data processing apparatus according to claim 8 or 9, wherein said generating means is adapted to generate a further modified data structure defining said modified grammar rules and the relationships with events in each further modality input.

11. A data processing method comprising the steps of:
receiving a data structure defining grammar rules for recognition of a natural language input;
analysing the data structure to identify positions in the grammar rules at which pauses can occur in the natural language input; and
generating a modified data structure defining modified grammar rules for recognition of a natural language input with pauses therein,
wherein the generating step includes fragmenting the grammar rules in accordance with said identified positions to generate sub grammar rules to form said modified data structure.

12. A data processing method according to claim 11, wherein the analysing step includes identifying the positions in accordance with pause criteria for the natural language input.

13. A data processing method according to claim 11 or claim 12, wherein the generating step includes adding marker means to said data structure to identify the positions in the grammar rules at which pauses can occur in the natural language input.

14. A data processing method according to claim 11, wherein the generating step includes forming a hierarchical structure using said sub grammar rules to form said modified data structure.

15. A data processing method according to claims 11 or 12, wherein the receiving step comprises receiving a data structure defining grammar rules for use in speech recognition of a natural language speech input, and the generating step comprises generating a modified data structure defining modified grammar rules for speech recognition of a natural language speech input with pauses therein.

16. A data processing method comprising the steps of:
receiving a data structure defining grammar rules for recognition of a natural language input;
analysing the data structure to identify positions in the grammar rules at which pauses can occur in the natural language input; and
generating a modified data structure defining modified grammar rules for recognition of a natural language input with pauses therein,
wherein the receiving step comprises receiving a data structure defining grammar rules for recognition of a natural language input as a first modality input in conjunction with associated events in at least one further modality input, said data structure defining the association between events in each modality input, events in said first modality input comprising units in the natural language.

17. A data processing method according to claim 16, wherein the analysing step comprises identifying said positions in the grammar rules based on events in at least one said further modality input.

18. A data processing method comprising:
receiving a data structure defining grammar rules for recognition of a natural language input;
analysing the data structure to identify positions in the grammar rules at which events in at least one further modality input can occur in the natural language input as a first modality input; and
generating a modified data structure defining modified grammar rules for recognition of a natural language input as the first modality input in conjunction with associated events in a said further modality input, said data structure defining the association between events in each modality input, and events in said first modality input comprising units in the natural language.

19. A data processing method according to claim 18, wherein the analysing step comprises identifying positions in the grammar rules at which pauses can occur in the natural language input based on events in at least one said further modality input.

20. Apparatus for generating data in a computer usable form, the apparatus comprising:
receiving means for receiving a natural language input with a number of pauses therein; and
recognition means for recognising said natural language input using the modified data structure generated using the method of any one of claims 11, 12, 18 or 19 to generate data in computer usable form.

21. Apparatus according to claim 20, wherein said recognising means comprises speech recognition means for recognising a natural language speech input.

22. Apparatus for generating data in a computer usable form, the apparatus comprising:
first modality receiving data generated for a natural language input by the apparatus of claim 20, said data comprising recognised units of the natural language and comprising data of a first modality input;
further modality receiving means for receiving data identifying events in at least one further modality input;
data structure receiving means for receiving a further modified data structure defining modified grammar rules and the relationships with events in each further modality, said further modified data structure having been generated using the method of claim 16;
analysing means for analysing the first modality input data and each further modality input data to determine if they match with any said modified grammar rule and related events in each further modality; and
generating means for generating computer usable data in dependence upon said analysis by said analysing means.

23. Apparatus according to claim 22, wherein said first modality receiving means is adapted to receive recognition data comprising an ordered list of likely natural language units to accompany the most likely natural language for each natural language unit recognised, and said analysing means is adapted to use said ordered list when the most likely natural language units do not result in a match with any modified grammar rule and related events in each further modality.

24. Apparatus according to claim 22, wherein said first modality receiving means is adapted to receive speech recognition data.

25. A data processing method according to claim 19, wherein the generating step includes generating a further modified data structure defining said modified grammar rules and the relationships with events in each further modality input.

26. A method of generating data in a computer usable form, the method comprising:
receiving a natural language input with a number of pauses therein; and recognising said natural language input using the modified data structure generated using the method of claim 18 to generate data in computer usable form.

27. A method according to claim 26, wherein the recognising step comprises speech recognition of a natural language speech input.

28. A method of generating data in a computer usable form, the method comprising:
- a first receiving step of receiving data generated for a natural language input by the method of claim 26, said data comprising recognised units of the natural language, and comprising data of a first modality input;
- a second receiving step of receiving data identifying events in at least one further modality input;
- a third receiving step of receiving a further modified data structure defining modified grammar rules and the relationship with events in each further modality, said further modified data structure having been generated using the method of claim 25;
- analysing the first modality input data and each further modality input data to determine if they match with any said modified grammar rule and related events in each further modality; and
- generating computer usable data in dependence upon said analysis.

29. A method according to claim 28, wherein the first receiving step comprises receiving recognition data comprising an ordered list of likely natural language units to accompany the most likely natural language unit for each natural language unit recognised, and the analysis step includes using the ordered list when the most likely natural language units do not result in a match with any modified grammar rule and related events in each further modality.

30. A method according to claim 29, wherein the first receiving step receives speech recognition data.

31. Processor implementable instructions for controlling a processor to carry out the method of any one of claims 11, 18, 19, 25 or 26.

32. A carrier medium for carrying the processor implementable instructions according to claim 31.

33. Data processing apparatus comprising:
- a receiver operable to receive a data structure defining grammar rules for recognition of a natural language input;
- an analyser operable to analyse the data structure to identify positions in the grammar rules at which pauses can occur in the natural language input; and
- a generator operable to generate a modified data structure defining modified grammar rules for recognition of a natural language input with pauses therein,
- wherein said generator is operable to fragment the grammar rules in accordance with said identified positions to generate sub grammar rules to form said modified data structure.

34. Data processing apparatus comprising:
- a receiver operable to receive a data structure defining grammar rules for recognition of a natural language input;
- an analyser operable to analyse the data structure to identify positions in the grammar rules at which pauses can occur in the natural language input; and
- a generator operable to generate a modified data structure defining modified grammar rules for recognition of a natural language input with pauses therein,
- wherein said receiver is operable to receive said data structure defining grammar rules for recognition of a natural language input as a first modality input in conjunction with associated events in at least one further modality input, said data structure defining the association between events in each modality input, and events in said first modality input comprising units in the natural language.

35. Data processing apparatus comprising:
- a receiver operable to receive a data structure defining grammar rules for recognition of a natural language input;
- an analyser operable to analyse the data structure to identify positions in the grammar rules at which events in at least one further modality input can occur in the natural language input as a first modality input; and
- a generator operable to generate a modified data structure defining modified grammar rules for recognition of a natural language input as the first modality input in conjunction with associated events in a said further modality input, said data structure defining the association between events in each modality input, and events in said first modality input comprising units in the natural language.

* * * * *

UNITED STATES PATENT AND TRADEMARK OFFICE
CERTIFICATE OF CORRECTION

PATENT NO. : 6,975,983 B1  Page 1 of 1
APPLICATION NO. : 09/699510
DATED : December 13, 2005
INVENTOR(S) : Nicholas David Fortescue et al.

It is certified that error appears in the above-identified patent and that said Letters Patent is hereby corrected as shown below:

COLUMN 1
Line 21, "use" should read --uses--.
Line 36, "the" should read --with the--.

COLUMN 4
Line 40, "conventional," should read --conventional--.
Line 58, "users" should read --user's--.

COLUMN 6
Line 42, "generating" should read --generate--.

COLUMN 7
Line 47, "sun" should read --Sun--.

COLUMN 11
Line 8, "employed-informing" should read --employed informing--.

COLUMN 12
Line 57, "a-pause," should read --a pause,--.

Signed and Sealed this

Fourth Day of March, 2008

JON W. DUDAS
*Director of the United States Patent and Trademark Office*